Dec. 17, 1946.   J. N. WOLFRAM ET AL   2,412,664
COUPLING FOR TUBES
Filed May 20, 1944   3 Sheets-Sheet 1
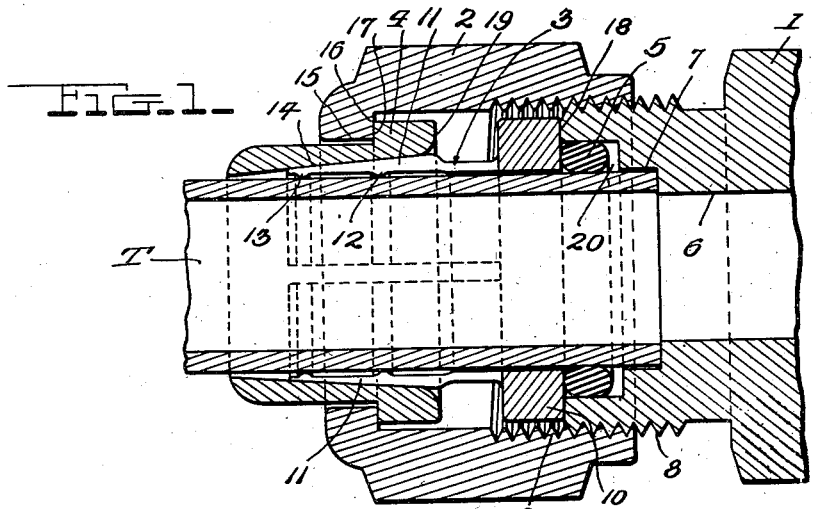
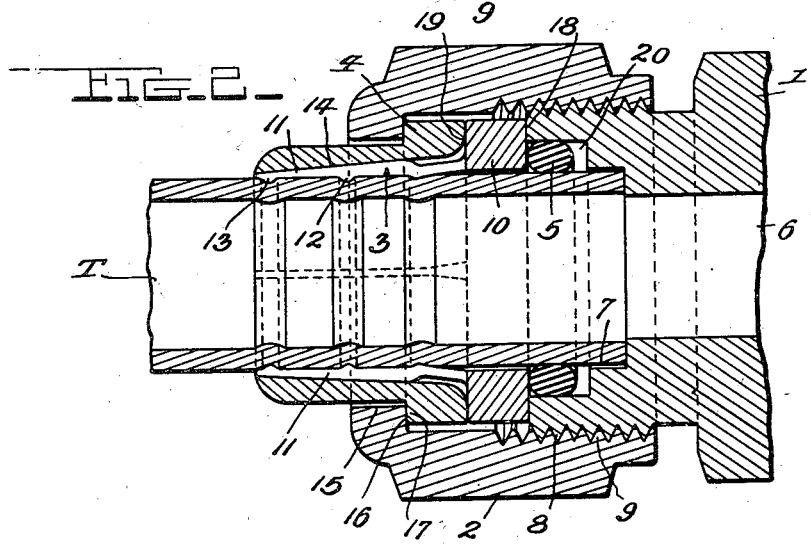
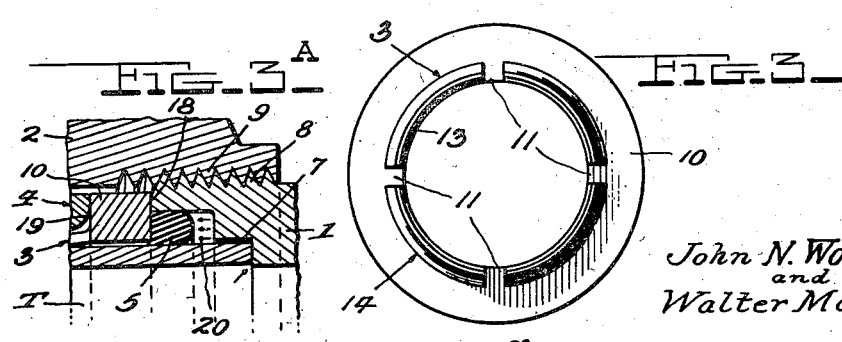
Inventors
John N. Wolfram
and
Walter Maky.
By Mason, Porter & Diller
Attorneys

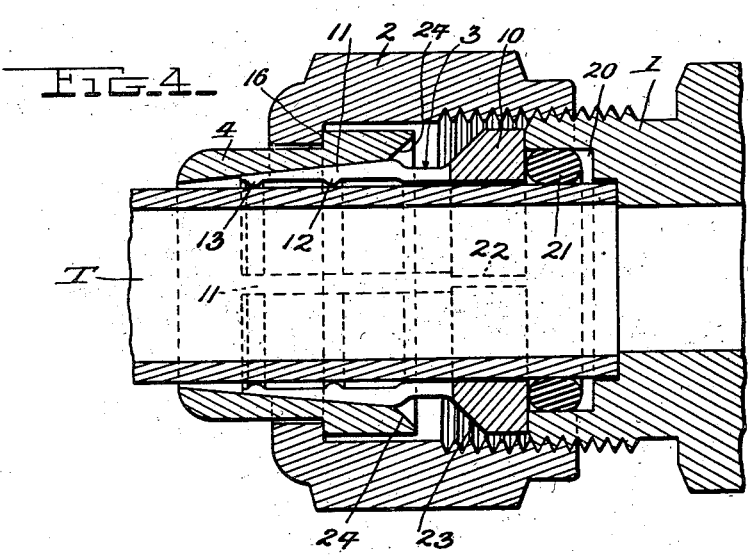
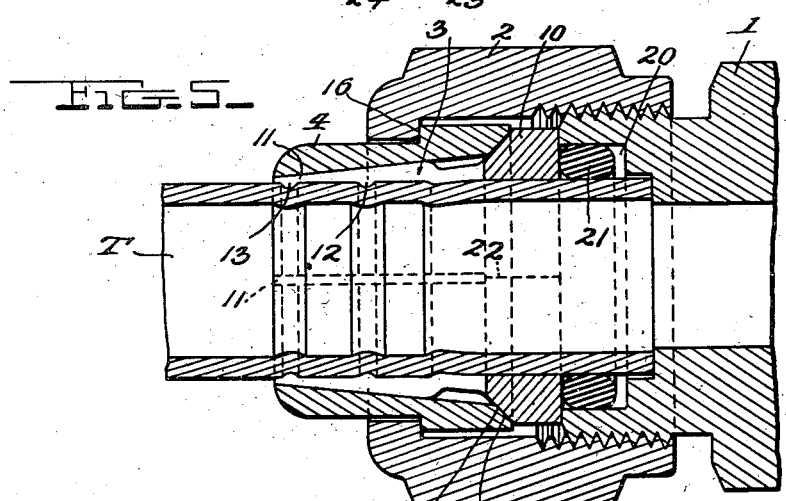
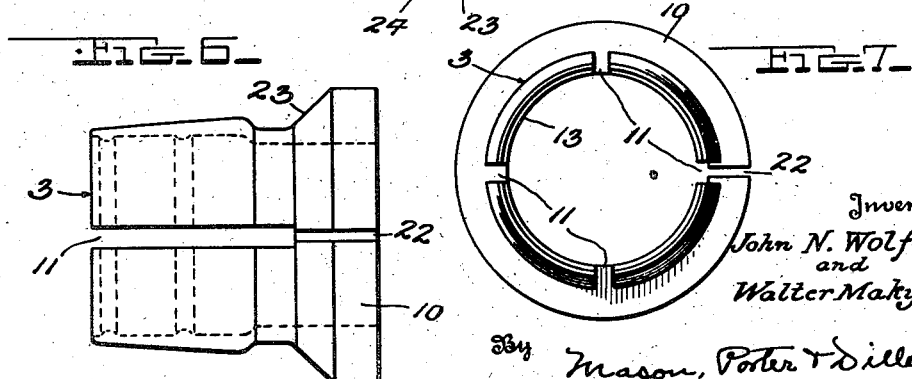

Dec. 17, 1946.    J. N. WOLFRAM ET AL    2,412,664
COUPLING FOR TUBES
Filed May 20, 1944    3 Sheets-Sheet 3
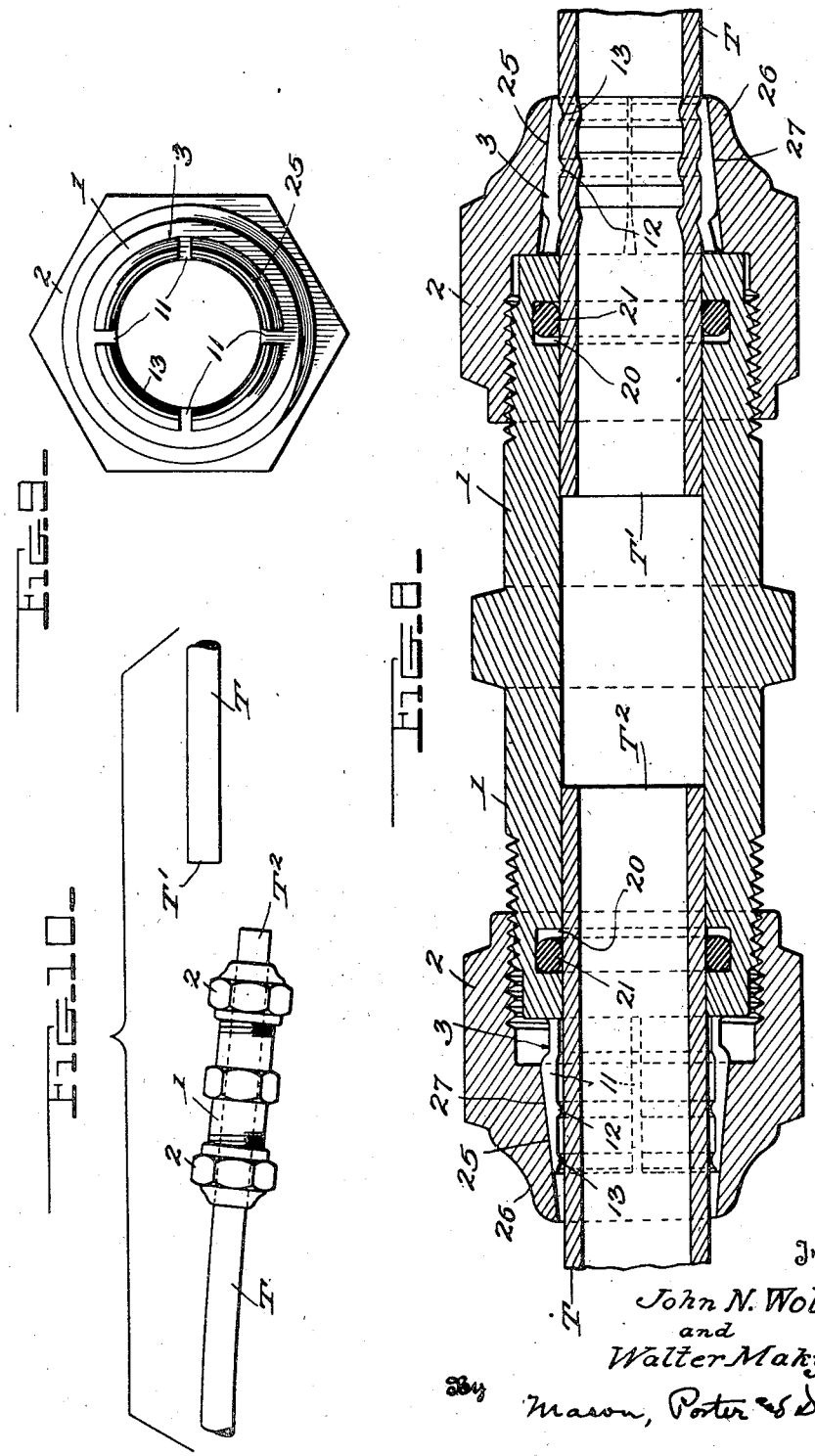
Inventors
John N. Wolfram
and
Walter Maky.
By Mason, Porter & Diller
Attorneys Patented Dec. 17, 1946

2,412,664

UNITED STATES PATENT OFFICE 2,412,664

COUPLING FOR TUBES

John N. Wolfram and Walter Maky, Cleveland, Ohio, assignors to The Parker Appliance Company, Cleveland, Ohio, a corporation of Ohio Application May 20, 1944, Serial No. 536,592

7 Claims. (Cl. 285—123)

The invention relates to new and useful improvements in couplings for tubes and more particularly a coupling which is adapted to securely hold and seal a flareless tube.

An object of the invention is to provide a coupling of the above type wherein the tube is secured to a body member by a threaded nut, sealed by a gasket disposed in a recess within the body member and adjacent the inner end of the tube and gripped by a contractible member operated on by said nut and extending outwardly along the tube from the end of the body member.

A further object of the invention is to provide a coupling of the above type wherein the gripping member is provided with spaced projections on its inner face which are embedded in the tube for gripping the same when the coupling is closed.

A further object of the invention is to provide a coupling of the above type wherein the gripping member is provided with longitudinal slots extending from the outer end thereof inwardly so as to facilitate the contraction of the gripping member.

A still further object of the invention is to provide a coupling of the above type wherein the gripping member is contracted by a collet which is forced endwise along the gripping member by the nut.

Another object of the invention is to provide a coupling of the above type wherein the endwise movement of the collet on the gripping member is positively limited so as to prevent undue deformation of the tube.

These and other objects are in part obvious and will in part be hereinafter more fully disclosed.

In the drawings—

Figure 1 is a longitudinal sectional view through a coupling embodying the improvements with the parts in initial assembled position;

Figure 2 is a view similar to Figure 1 but showing the coupling closed and the tube gripped so as to prevent endwise movement thereof in the coupling;

Figure 3 is an end view of the clamping member for gripping the tube and showing the slots which extend inwardly from the end of the clamping member for facilitating the contraction of the same;

Figure 3a is a detail showing the deformation of the gasket and the intimate contact of the gasket with the parts of the coupling and the tube caused by the fluid pressure entering the recess;

Figure 4 is a view similar to Figure 1 but showing a slightly modified form of clamping member for gripping the tube and collet for contracting the clamping member;

Figure 5 is a view similar to Figure 4 showing the coupling closed and the tube gripped and sealed;

Figure 6 is a side view of the clamping sleeve shown in Figures 4 and 5;

Figure 7 is an end view of the clamping sleeve shown in Figure 6;

Figure 8 is a longitudinal sectional view showing a slightly modified form of coupling and the use of two couplings and a body member for connecting two ends of tubing;

Figure 9 is an end view of the coupling;

Figure 10 is a view in side elevation showing the coupling used for repairing a fracture in the tube.

The invention has to do with a coupling for tubes and more particularly a tube which is of uniform diameter all the way to the end thereof and commonly referred to as a flareless tube. The coupling as shown in Figures 1, 2 and 3 inclusive includes a body member 1, a nut 2, a clamping sleeve or member 3, a collet 4 which operates upon the clamping sleeve for contracting the same for gripping the tube which is indicated at T. The coupling also includes a gasket 5 which is disposed in a recess in the body member 1 so as to contact with the outer wall of the tube and the wall of the recess in the body of the tube. The body member 1 is provided with a bore 6 which is of substantially the same diameter as the bore of the tube which is to be clamped to the body member. Said body member as shown in Figure 1 is counter-bored at 7 to form a seat for the end of the tube. This is a positioning seat which locates the tube in the coupling and centers it relative to the coupling.

The body portion is also provided with a thread 8 adapted to be engaged by a thread 9 on the nut 2. The nut is provided with a recess in which the clamping sleeve 3 is located. This clamping sleeve 3 is formed with a solid head 10 as shown in Figure 3. Projecting outwardly from this head is the clamping portion of the sleeve. This clamping portion of the sleeve is provided with a series of slots 11, four in number, as shown in Figure 3. This makes the sleeve readily contractible in the region of the slots. On the inner face of the clamping sleeve are ribs or projections 12 and 13. These ribs or projections are adapted to be embedded in the tube for a firm grip between the sleeve and the tube. The outer face 14 of this clamping sleeve is tapered so that it is gradually enlarged from the outer end toward the head 10. This clamping sleeve is made with a very slight clearance so it may be readily slipped onto the tube. It is noted that the tapered outer face 14 of the sleeve is spaced a short distance from the solid head 10 and that the slots 11 extend all the way from the outer end of the clamping sleeve to the solid head 10.

The collet 4 is in the form of a solid sleeve, the inner face of which is tapered substantially on the same angle as the outer face of the sleeve This tapered face of the collet when the collet is forced along the sleeve serves to contract the sleeve and cause it to grip the tube. The nut 2 has an inwardly extending part 15 forming a shoulder 16. The opening in the outer end of the nut is such that the sleeve 3 and the collet 4 extend outwardly beyond the nut. The collet 5 has a shoulder 17 which is contacted with by the shoulder 16 on the nut.

The solid head 10 is adapted to abut against the outer end 18 of the body member so that when the nut is threaded onto the body member the collet will be forced along the sleeve and cause the sleeve to be contracted as shown in Figure 2. The inner end 19 of the collet 4 is limited in its movement by contacting the solid head 10 of the sleeve which, as noted, abuts against the outer end of the body member 1. When the nut is turned onto the body member and the sleeve is contracted, the projections or ribs 12 and 13 will be embedded in the tube, after which further turning of the nut onto the body member will be limited by the collet abutting against the solid head of the sleeve. This prevents undue deforming of the tube.

As a means for sealing the connection of the tube to the body member, said body member is provided with a recess 20 which opens into the bore of the body member. As shown in Figures 1 and 2 this recess is formed in the inner end portion of the body member. The gasket 5, normally circular in cross section is placed in the recess and when the tube is inserted the gasket is of such dimension that it will make a tight seal with the wall of the body member and also a tight seal with the outer wall of the tube. The coupling is particularly adapted for tubes in which fluid under very high pressure is conveyed. The fluid under high pressure will pass the seat against which the tube makes contact and will enter the recess 20 and bear against the gasket and force the gasket into tight sealing contact with the tube, the solid head 10 and the body member, as shown in Figure 3a. It will be noted that the sleeve can fit the tube with only a slight clearance and therefore when the gasket is deformed by the fluid pressure thereagainst, the gasket will not be forced into the space between the tube and the clamping head of the sleeve. It will also be noted that the grip of the clamping sleeve is well outward along the tube from the solid head and therefore the gripping of the tube and deforming of the same by the embedding of the ribs 12 and 13 into the tube will not disturb the initial shaping of the tube in the region of the gasket and the clamping head of the sleeve will retain its close position to the tube wall.

In Figures 4 to 7 the coupling is very similar to that shown in Figures 1 to 3. The coupling includes a body member 1 and a nut 2, a clamping sleeve 3 and a collet 4. The nut has a threaded connection with the body member and is provided with a shoulder 16 which is adapted to engage a shoulder on the collet. The outer face of the sleeve is tapered to conform to the inner tapered face of the collet 4. The inner sleeve is also provided with inwardly projecting portions or ribs 12 and 13 which are embedded in the tube when the coupling is closed. The clamping sleeve 3 is formed with slots 11 and the head 10, instead of being solid as shown in Figure 3, is provided with a slot 22. The outer face of this head 10 of the sleeve is tapered as indicated at 23. The inner face 24 of the collet 4 is tapered to correspond to the taper 23 on the head of the sleeve. When the coupling is closed this tapered face 24 will engage the tapered face 23 on the sleeve and will close up the slot 22, thus causing the head of the sleeve to make tight contact with the tube. The body member 1 has a recess 20 for a sealing gasket 21. The fluid under pressure will pass into the recess 20 and bear against the gasket. The gasket will be deformed into very firm contact with the wall of the recess 20, the outer wall of the tube and the inner face of the head 10 of the sleeve. Inasmuch as the sleeve is contracted at the head thereof into tight contact with the tube, there is no chance for the gasket under this fluid pressure to be extruded inbetween the head 10 and the tube and thus a very tight sealing of the tube is accomplished.

In Figure 8 a slightly modified form of coupling is shown and the use of two couplings for repairing a break in a tube is also illustrated. The couplings are similar in construction and also are very similar to the couplings which have already been described, and one of these couplings will, therefore, be very briefly defined. The coupling includes a body member 1, a nut 2, and a clamping member 3. As shown in Figure 8, this clamping member 3 is formed integral with the body member 1. The clamping sleeve is provided with slots 11 and with ribs or projections 12 and 13. The outer face of the clamping member 3 is tapered as indicated at 25. In this form of the coupling the nut directly contacts with the portion of the sleeve that is to be contracted and the collet has been omitted. The nut has an extended portion 26 provided with a tapered inner face 27.

The body member 1 is provided with a recess 20 in which is located a gasket 21. The body member 1 is elongated and serves as a body member for both the coupling at the right and at the left in Figure 8. It is noted that these couplings are similar in construction. The coupling at the left is shown as initially applied to the tube end and the coupling at the right is shown as closed on the tube end. The coupling as illustrated in Figure 8 is particularly adapted for the repair of fractured tubes. In Figure 10 a tube is indicated at T. The tube was ruptured and the coupling is shown as being applied for repairing the tube. The ruptured portion of the tube is cut out so as to leave two spaced ends $T^1$ and $T^2$. The coupling, as a whole as illustrated in Figure 8, is slid onto the end $T^2$ of the tube. The tube may be sprung laterally out of alignment with the end $T^1$ of the tube to permit the coupling to be applied. After the coupling has been slid onto the end $T^2$ of the tube, the ends are brought into alignment and the coupling is moved to the right until it is engaged with the end $T^1$ of the tube. The coupling as shown in Figure 8 illustrates, on an enlarged scale, the connection of these two ends $T^1$ and $T^2$ of the tube. After the coupling has been placed, then the coupling at one end is closed and then the coupling at the other end is closed. This makes a very tight connection between the two ends of the tube and the repair is complete.

Instead of utilizing the specific form of coupling shown in Figure 8, the coupling shown in Figure 1 or Figure 4 may be used in the same way for the joining of the ends of tubes or repairing the same.

It is obvious that minor changes in the details of construction may be made without departing from the spirit of the invention as set forth in the appended claims.

We claim:

1. A coupling for tubes comprising a body member having a bore adapted to receive the tube and a recess opening into said bore, a nut having threaded engagement with said body member, a tube clamping member projecting outwardly along the tube from said body member and having slots extending inwardly from the outer end thereof, means operated by said nut for contracting said slotted end of the clamping member for gripping the tube and a gasket completely housed within said recess and adapted to make initial sealing contact with said body member and said tube, said recess and bore being dimensioned so that fluid pressure on the tube will deform the gasket into tighter sealing contact with the tube and the body member.

2. A coupling for tubes comprising a body member having a bore adapted to receive the tube and a recess opening into said bore, a nut having threaded engagement with said body member, a clamping sleeve disposed within said nut and projecting outwardly from the body member, said sleeve having slots formed therein, a collet surrounding said sleeve and having a shoulder engaged by the nut for moving said collet endwise of the sleeve, the adjacent contacting faces of the sleeve and collet being tapered whereby the movement of the collet onto the sleeve will contract the sleeve into gripping engagement with the tube and a gasket in said recess and adapted to make sealing contact with the body member and said tube.

3. A coupling for tubes comprising a body member having a bore adapted to receive the tube and a recess opening into said bore, a nut having threaded engagement with said body member, a clamping sleeve having a head adapted to abut against the outer end of the body member, said sleeve having a clamping portion extending outwardly along the tube from said head with slots in said clamping portion extending lengthwise thereof, the recess in said body member being disposed at the end thereof and closed by the head of said sleeve, a collet surrounding said clamping portion of the sleeve and having a shoulder engaged by said nut whereby said collet is moved endwise of the sleeve for contracting the same, the adjacent contacting faces between the sleeve and the collet being tapered, a gasket disposed in said recess and adapted to make sealing contact with the body member, the sleeve head and the tube.

4. A coupling for tubes comprising a body member having a bore adapted to receive the tube and a recess opening into said bore, a nut having threaded engagement with said body member, a clamping sleeve having a head adapted to abut against the outer end of the body member, said sleeve having a clamping portion extending outwardly along the tube from said head with slots in said clamping portion extending lengthwise thereof, the recess in said body member being disposed at the end thereof and closed by the head of said sleeve, a collet surrounding said clamping portion of the sleeve and having a shoulder engaged by said nut whereby said collet is moved endwise of the sleeve for contracting the same, the adjacent contacting faces between the sleeve and the collet being tapered, the inner face of said sleeve having spaced projecting ribs adapted to be embedded in the tube and a gasket disposed in said recess and adapted to make sealing contact with the body member, the sleeve head and the tube.

5. A coupling for tubes comprising a body member having a bore adapted to receive the tube and a recess opening into said bore, a nut having threaded engagement with said body member, a clamping sleeve having a head at the inner end thereof adapted to abut against the outer end of the body member, said sleeve having a clamping portion extending outwardly along the tube from said head with slots in said clamping portion extending lengthwise thereof, the recess in said body member being disposed at the end thereof and closed by the head of said sleeve, a collet surrounding said clamping portion of the sleeve and having a shoulder engaged by said nut whereby said collet is moved endwise of the sleeve for contracting the same, the adjacent contacting faces between the sleeve and the collet being tapered, said collet being dimensioned so as to engage the head of the sleeve for limiting the contraction of the sleeve and a gasket disposed in said recess and adapted to make sealing contact with the body member, the sleeve head and the tube.

6. A coupling for tubes comprising a body member having a bore adapted to receive the tube and a recess opening into said bore, a nut having threaded engagement with said body member, a clamping sleeve having a head at the inner end thereof adapted to abut against the outer end of the body member, said sleeve having a clamping portion extending outwardly along the tube from said head with slots in said clamping portion extending lengthwise thereof, the recess in said body member being disposed at the end thereof and closed by the head of said sleeve, a collet surrounding said clamping portion of the sleeve and having a shoulder engaged by said nut whereby said collet is moved endwise of the sleeve for contracting the same, the adjacent contacting faces between the sleeve and the collet being tapered, said sleeve head having a slot therethrough whereby it may be contracted, the outer face of said sleeve head being tapered and the inner face of said collet being tapered and adapted to engage the tapered face of the sleeve head for contracting said sleeve head into engagement with the tube and a gasket disposed in said recess and adapted to make sealing contact with the body member, the sleeve head and the tube.

7. A coupling for tubes comprising a body member having a bore adapted to receive the tube and a recess opening into said bore, a nut having threaded engagement with said body member, a clamping sleeve formed integral with the body member and extending outwardly along said tube, said clamping member having longitudinal slots formed therein and inwardly projecting spaced ribs for engagement with the tube, the outer face of said clamping member being tapered and adapted to be engaged by the tapered inner face of the nut whereby the threading of the nut onto the body member will contract said clamping sleeve into engagement with the tube and cause the ribs to be embedded in said tube, a gasket disposed in said recess and adapted to make sealing contact with the body member and said tube.

JOHN N. WOLFRAM.
WALTER MAKY.